US009235347B2

(12) United States Patent
Klein et al.

(10) Patent No.: US 9,235,347 B2
(45) Date of Patent: *Jan. 12, 2016

(54) SYSTEM, METHOD AND COMPUTER PROGRAM PRODUCT FOR SYNCHRONIZING DATA WRITTEN TO TAPE INCLUDING WRITING AN INDEX INTO A DATA PARTITION

(71) Applicant: KIP CR P1 LP, New York, NY (US)

(72) Inventors: Andrew Glen Klein, Leander, TX (US); Robert C. Sims, Round Rock, TX (US); William H. Moody, II, Austin, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,457

(22) Filed: Jan. 7, 2015

(65) Prior Publication Data

US 2015/0127980 A1 May 7, 2015

Related U.S. Application Data

(63) Continuation of application No. 13/532,518, filed on Jun. 25, 2012, now Pat. No. 8,954,663.

(51) Int. Cl.
*G06F 3/06* (2006.01)
*G06F 12/00* (2006.01)

(52) U.S. Cl.
CPC ............ *G06F 3/0619* (2013.01); *G06F 3/0601* (2013.01); *G06F 3/0643* (2013.01); *G06F 3/0644* (2013.01); *G06F 3/0682* (2013.01); *G06F 3/0686* (2013.01); *G06F 2212/213* (2013.01)

(58) Field of Classification Search
None
See application file for complete search history.

(56) References Cited

U.S. PATENT DOCUMENTS

| 8,527,561 | B1 | 9/2013 | Moody et al. |
| 8,566,517 | B1 | 10/2013 | Sims et al. |
| 8,762,330 | B1 * | 6/2014 | Kick .............................. 707/613 |
| 8,817,411 | B1 * | 8/2014 | Sims et al. .................... 360/72.1 |
| 8,954,663 | B1 | 2/2015 | Klein et al. |
| 2009/0198737 | A1 | 8/2009 | Sims |
| 2011/0238716 | A1 | 9/2011 | Amir et al. |
| 2013/0185500 | A1 * | 7/2013 | Haustein et al. ............... 711/111 |

OTHER PUBLICATIONS

Pease, David, et al., "The Linear Tape File System," 2010 IEEE Symposium on Mass Storage Systems and Technologies, May 3-7, 2010, pp. 1-8.

(Continued)

*Primary Examiner* — Yong Choe
*Assistant Examiner* — Glenn Gossage
(74) *Attorney, Agent, or Firm* — Sprinkle IP Law Group

(57) ABSTRACT

A system, method and computer program product for synchronizing data written to tape with improved data recovery. When writing data to tape, an index is kept in memory and updated to reflect change(s) to a file system mounted on tape. After a predetermined amount of data is written to a tape, a device may perform a sync operation, causing the index to be written into a data partition of the tape. If the sync operation is successful, the index in the index partition of the tape can be updated using a copy of the index in the data partition of the tape next time the tape is mounted. If the sync operation is not successful, the device may write the data to a different location on the same or another tape, update the index, and force another sync operation. This process can be repeated.

20 Claims, 5 Drawing Sheets

(56) References Cited

OTHER PUBLICATIONS

Linear Tape File System (LTFS) Format Specification, LTFS Format Version 2.0.0., Mar. 11, 2011, retrieved from <<http://www.trustito.com/LTFS_Format_To%20Print.pdf>> on Sep. 29, 2011, 69 pgs.

Long Term File System Information Center 1.2.1.1, Overview, LTFS Format, IBM Corp., 2010, 1 pg.

HP Linear Tape File System (LTFS), HP OEM Newsletter, Sep. 2010, 15 pgs.

Anyone Using LTFS with LTO-5? Post, Reduser.net, retrieved from <<http://reduser.net/forum/showthread.php?t=50309>> on Sep. 29, 2010, 3 pgs.

Coolen, Ilja, IBM's Long Term Filesystem, short term usage? Apr. 26, 2010, retrieved from <<http://www.iljacoolen.nl/2010/04/ibms-long-term-filesystem-short-term-usage/>> 3 pgs.

Office Action for U.S. Appl. No. 13/532,518, mailed Apr. 23, 2014, 18 pgs.

HP StorageWorks, HP LTFS Linear Tape File System User Guide, Fourth Ed., HP Part No. EH957-90932, published Mar. 2011, pp. 1-19.

Richmond, Michael, "How Does LTFS Work," Jun. 24, 2011, retrieved from <<http://www.smallersystems.com/blog/2011/06/how-does-ltfs-work/>> on Apr. 14, 2014, 11 pgs.

Richmond, Michael, "Sync ( ) Behavior in LTFS," Jul. 6, 2011, retrieved from <<http://www.smallersystems.com/blog/2011/07/sync-behavior-in-LTFS/>> on Apr. 14, 2014, 4 pgs.

Pease, "Linear Tape File System," Storage Developer Conference (SDC), Sep. 19-22, 2011, pp. 1-18.

Notice of Allowance for U.S. Appl. No. 13/532,518, mailed Oct. 7, 2014, 2 pgs.

\* cited by examiner

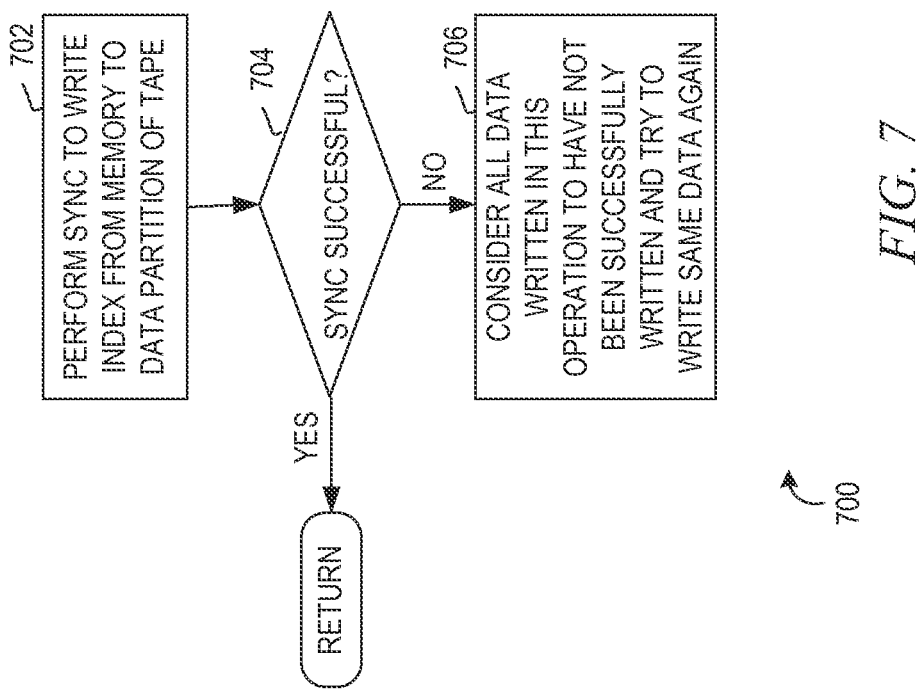

SYSTEM, METHOD AND COMPUTER PROGRAM PRODUCT FOR SYNCHRONIZING DATA WRITTEN TO TAPE INCLUDING WRITING AN INDEX INTO A DATA PARTITION

CROSS-REFERENCE TO RELATED APPLICATION(S)

This application is a continuation of, and claims a benefit of priority under 35 U.S.C. 120 of the filing date of U.S. patent application Ser. No. 13/532,518, filed Jun. 25, 2012, entitled "SYSTEM, METHOD AND COMPUTER PROGRAM PRODUCT FOR SYNCHRONIZING DATA WRITTEN TO TAPE INCLUDING WRITING AN INDEX INTO A DATA PARTITION SO THAT DATA CAN BE RECOVERED IN CASE OF FAILURE," now U.S. Pat. No. 8,954,663, which is fully incorporated by reference herein for all purposes.

TECHNICAL FIELD

This disclosure relates generally to the field of file archiving using media libraries and Linear Tape File System (LTFS). More particularly, this disclosure relates to synchronizing sets of files written to LTFS tapes and recovering in case of failure

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data is unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, for example, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router, etc.), the tape libraries may be further addressed by bus number.

In current tape library systems, each tape library may present itself as an independent entity on the network. Each host in these systems maintains a view (i.e., a table of target numbers, LUNs and element numbers) of each of the tape libraries. Using this address information a host can format commands to the tape library to perform read/write, backup and other operations. In order to coordinate activities, hosts must cooperate with each other in issuing these commands.

Enabling cooperation, however, requires some form of application to arbitrate between the various hosts or applications that are accessing the tape library. Thus, it may be necessary to employ some form of application (such as a backup application, like Symantec® Netbackup) to read and write tapes in a tape library. Many of these issues may be dealt with only in software if the hosts use the same application or at least compatible applications. For example, if two hosts use the same backup application to store their data to tape, the application can coordinate the access requests of the two hosts so that both are backed up to the tape library. If, on the other hand, the two hosts use different backup applications, the applications will most likely not be able to coordinate their actions to ensure that both of the hosts are properly backed up, since they were probably independently designed and are consequently incompatible. Thus, to prevent conflicts between hosts, each host must typically use the same application to access a shared tape library. This can be inefficient as individual tape libraries cannot store data from multiple applications. Moreover, the files written on a tape by a backup application are written in a format proprietary to that backup application. Thus, to restore or otherwise access files on those tapes, the same backup application is required.

Recently, however, the Ultrium Linear Tape Open (LTO)-5 specification for tapes (which is hereby incorporated by reference in its entirety for all purposes) has included support for partitioning. The Linear or Long Term File System, also referred to as the Linear Tape File System, (LTFS) Format Specification by IBM® and Ultrium® (which is also hereby fully incorporated by reference in its entirety for all purposes) makes use of this partitioning support to define a tape format. The LTFS tape format defines a file system for LTO-5 tapes using an eXtensible Markup Language (XML) schema architecture and was utilized in conjunction with the IBM® LTO Gen5 Drive. This file system support allows the use of an LTFS-formatted tape as if it were a file system. Files and directories may appear in a directory listing, files may be dragged and dropped from tape, data may be accessed at the file level, etc. With LTFS, tape media can be used like other storage media (e.g. flash drive, hard disk drives, etc.).

Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

Although LTFS makes the use of a single tape much simpler, it does, however, have limitations. As defined in the current specification, the LTFS file system may be limited to a single tape. If it is desired to use multiple LTFS tapes, these tapes are mounted one at a time or additional support is provided. While the capacity of an LTO-5 tape is relatively high (e.g., around 1500 GB to 3.0 TB or greater) in the realm of business data and backup applications this is a major restriction.

Furthermore, LTFS is a new technology. Users of LTFS do not currently have a method of recovering from failure when attempting to write files to LTFS. In view of current limitations of the LTFS specification, there remains room for innovations and improvements.

SUMMARY

As discussed above, any operating system that includes LTFS support can mount an LTFS-formatted tape and read and write the files thereon. The mount operation reads the index from the index partition of the tape into a memory. This index is kept in the memory until the tape is unmounted. The index in the memory is updated whenever a change is made to a file system mounted on the tape. The index in the index partition of the tape is not updated dynamically because the tape has to be repositioned each time to write to the index partition. Consequently, if the system crashes after some data are written to the tape, the data will be on the tape, however, since the index on the tape is not up-to-date, the LTFS file system will not accurately reflect all the data on the tape when the tape is re-mounted. A copy of the index is always written to the data partition of the tape. One option is to write a copy of the index to the data partition at a time interval. Another option is to write a copy of the index to the data partition on every file close. Yet another option is to write a copy of the index to the data partition only at the time the tape is unmounted. A copy of the index can also be written to the data partition using an LTFS Sync operation.

Embodiments disclosed herein provide a system and method for verifying when data is synchronized on an LTFS tape and for recovering the data in case of failure. A copy of the index is written to the data partition at the time the tape is unmounted in combination with an LTFS Sync operation. The system and method utilize the success of an LTFS Sync operation as the indicator of successful data transfer onto an LTFS medium. For example, after a predetermined amount of data is written to a tape, a device implementing an embodiment disclosed herein may perform an LTFS Sync, causing the index in the memory to be written into the data partition of the tape. The index in the index partition is updated when the LTFS file system is unmounted. If an error occurs and the index in the index partition cannot be updated when the LTFS file system is unmounted, the index in the index partition of the tape can be updated using a copy of the index in the data partition of the tape the next time the tape is mounted. If the index has changed since it was last written to the data partition, the unmount operation causes a copy of the index to be written to the data partition then to the index partition. In this way, the index in the data partition is kept up to date (in normal operation), so the unmount operation would only need to write the index to the index partition. If an error case occurs in which the normal unmount process does not take place, then the index in the data partition is newer than the index in the index partition. When detected during the LTFS mount operation, this causes the mount to fail in which case the ltfsck utility can be used to recover the tape, making the index in the index partition match the newer index in the data partition. In one embodiment, the ltfsck operation is automatically performed if a mount operation fails. If the LTFS Sync is not successful, the device may consider the data as never having been successfully written to tape. The operation to write the data to tape can then be retried—either on the same tape or a different tape—as a natural consequence of the operation not having been successful. Afterwards, the device may update the index and force another LTFS Sync. This process can be repeated until an LTFS Sync is successful. In this way, data written to an LTFS mounted file system are retrievable in their entirety from the tape the next time the tape is loaded after any failure regardless of the failure.

The device may be physically connected to a tape library where the tape is loaded in a tape drive. The memory may reside in the device. The amount of data being written may be configured to accommodate to a partition scheme defined in the LTFS specification. The data may be from one or more files. In one embodiment, the one or more files are of a sufficient amount to write two wraps or a multiple thereof on a tape. In one embodiment, the device implements an archive node appliance.

A computer program product implementing the method disclosed herein may comprise at least one non-transitory computer readable medium storing instructions translatable by a processor to perform the method. Embodiments disclosed herein may implement any suitable computer readable medium, including those known in the art (e.g., optical disk, magnetic disk, flash memory, RAM, ROM, EEPROM or other computer readable medium).

Embodiments disclosed herein may provide a number of advantages. For example, the method of recovery in case of failure will attempt to write the file(s) again in such a way that any previous (incomplete) version of the file(s) is not preserved. In this way, only complete, valid, retrievable files are left on the LTFS medium. Furthermore, the method provides a way to communicate the state of an LTFS-based file system with respect to any partial or failed file transfers without requiring that the tape is mounted and file contents are compared.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 depicts a flow diagram illustrating an example of a method of writing data to tape.

DETAILED DESCRIPTION

Figure 1:
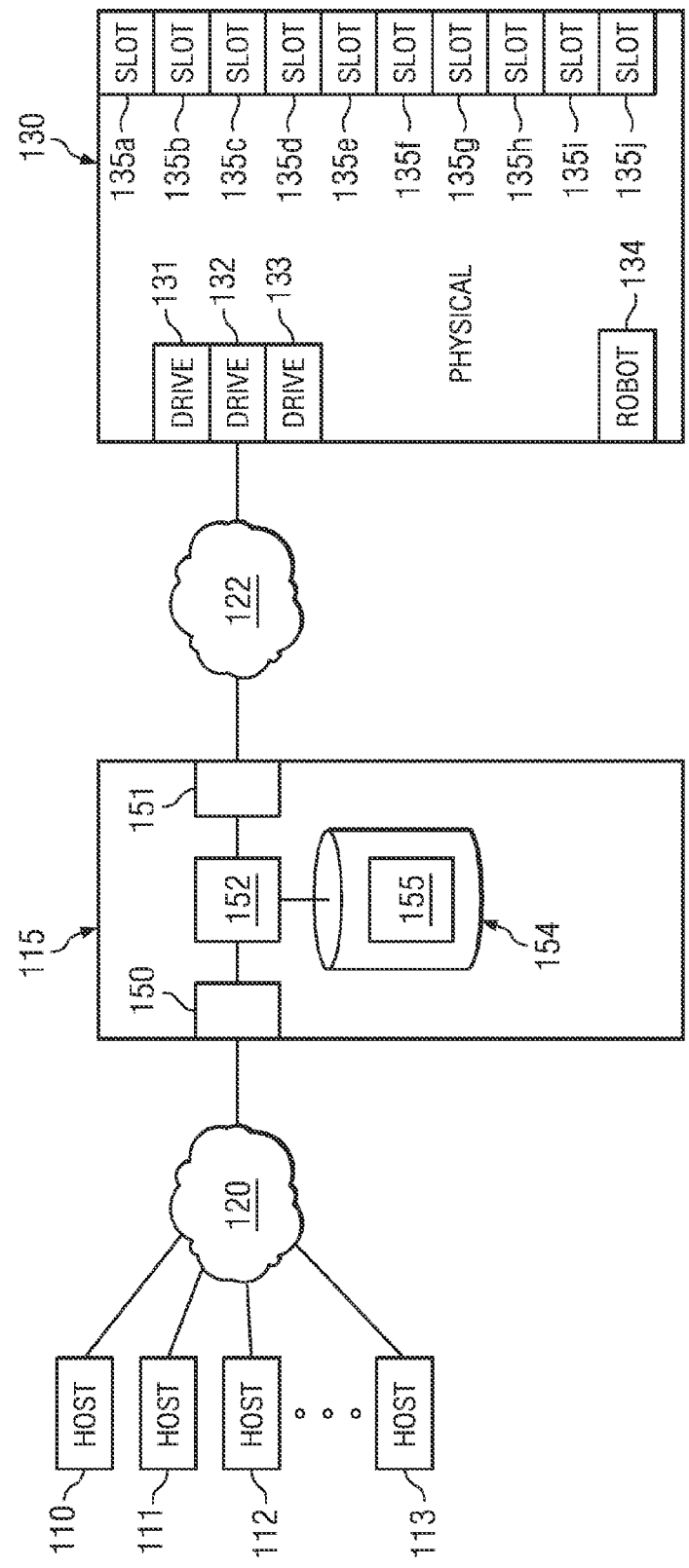
FIG. 1 depicts a diagrammatic representation of one embodiment of a system comprising an Archive Node Appliance.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, an example hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more non-transitory computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java®, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

In many instances it may be desired to provide a file system utilizing media libraries. As an example, FIG. 1 depicts a diagrammatic representation of a system in which a media library is managed to present a network based file system to a plurality of hosts (i.e., host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this example, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

In the example of FIG. 1, Archive Node Appliance 115 is connected to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in FIG. 1, it should be understood that Archive Node Appliance 115 can be implemented in a variety of manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135a-j). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that, although FIG. 1 depicts only a single media library, Archive Node Appliance 115 can be implemented to connect to and utilize multiple media libraries.

Archive Node Appliance 115 comprises a computer processor 152 and a computer readable memory 154 (e.g. RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art. In one embodiment, computer instructions 155 can include code implementing a methodology disclosed herein. In one embodiment, the methodology is embodied in a module residing in an Archive Node Appliance. Example embodiments of the methodology, module, and Archive Node Appliance are described below.

In operation, computer instructions 155 can be executable such that Archive Node Appliance 115 can present a network based file system (i.e. a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5 compliant drives and tapes in media library 130 may be formatted according to the Linear Tape File System (LTFS) Format Specification, which is incorporated by reference herein. Computer instructions 155 may be executable to store files received through a network based file system on LTFS tapes in media library 130 and maintain mapping information between the files visible through the network based file system and the location of those files in media library 130.

Files visible through a network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, and use LTFS to mount the LTFS file system on the tape and access the file to, for example, read the file (as a whole or the remainder of the file) into the intermediate storage.

To increase performance, in some embodiments, it may be desired to store files on computer readable memory 154 when they are initially received, and migrate these files to media library 130 at a later point. Computer instructions 155 may therefore be executable to store files stored by hosts using the network based file system to computer readable memory 154. At some later point, the computer executable instructions 155 may be executable to migrate the file from computer readable memory 154 to media library 130. In this case, computer executable instructions 155 are executable to maintain mapping information between the files visible through the network based file system and the location of those files on computer readable memory 154 or media library 130.

The use of LTFS in conjunction with media library 130 can afford a number of advantages when employed by an Archive Node Appliance 115 to implement a networked based file system. One important advantage is that the file system structure presented through the file system may be substantially mirrored on the tapes of media library 130. Accordingly, if there is a failure of Archive Node Appliance 115 or media library 130, the files on the tapes of media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

Numerous implementations of the Archive Node Appliance described above are possible and anticipated. Additional examples of the Archive Node Appliance can be found in U.S. patent application Ser. No. 13/267,758, filed Oct. 6, 2011, and entitled "System, Method and Computer Program Product For Optimization Of Tape Performance," now U.S. Pat. No. 8,817,411, which is fully incorporated herein for all purposes.

Figure 2:
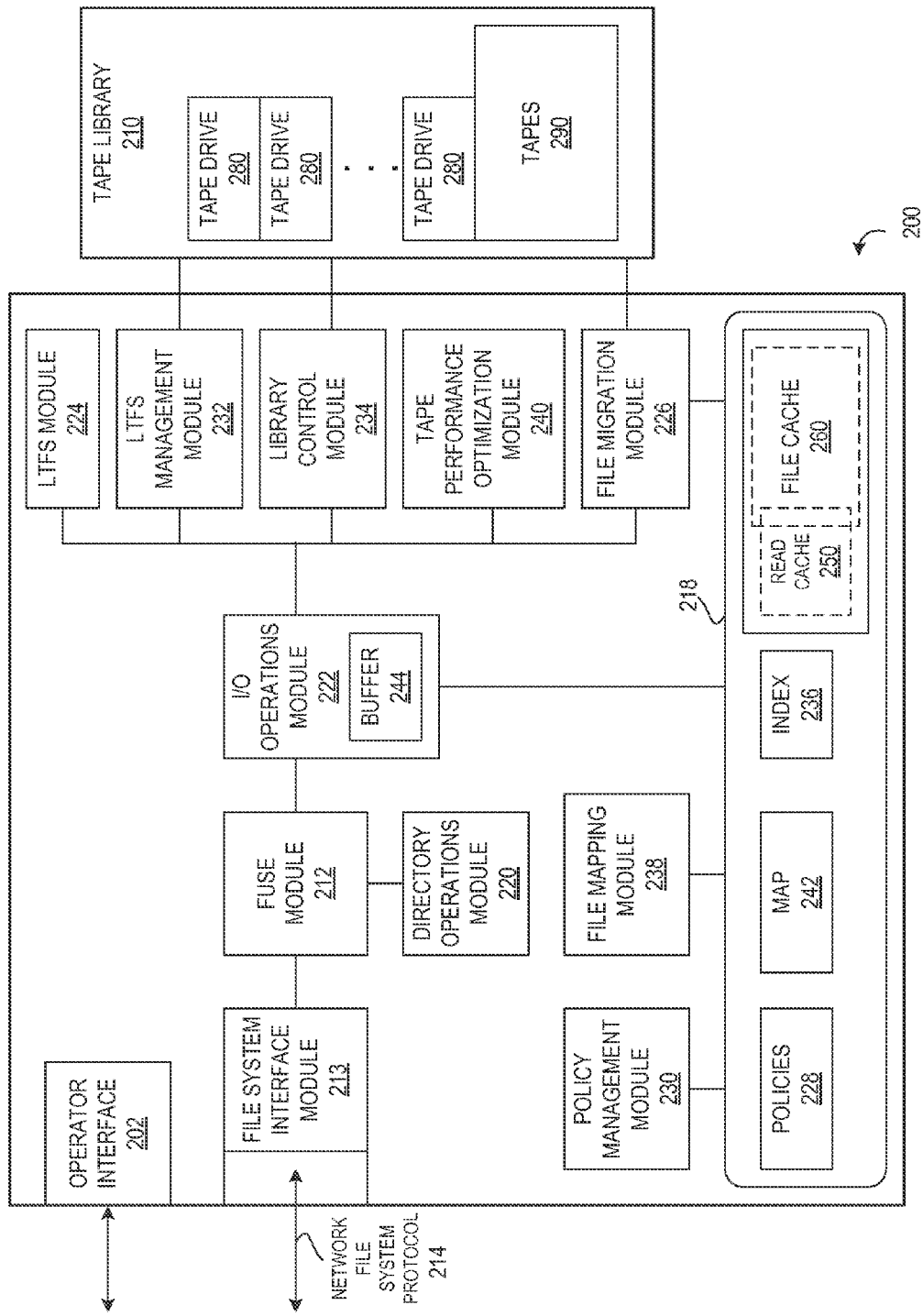
FIG. 2 depicts a diagrammatic representation of one embodiment of a system comprising an Archive Node Appliance connected to one embodiment of a tape library.

Turning now to FIG. 2, one embodiment of a functional architecture for an Archive Node is depicted. Archive Node Appliance 200 may provide an operator interface 202 through which Archive Node Appliance 200 may be configured. Operator Interface 202 can be used to configure, monitor, and control the entire system. Such an operator interface 202 may be provided, for example, using a network based interface such as a set of web pages or the like. In the example of FIG. 2, Archive Node Appliance 200 is connected to tape library 210, which comprises a set of tape drives 280 and tapes 290, some of which may contain LTFS formatted tapes. Those skilled in the art will appreciate that a tape drive that is compatible with LTFS does not necessarily only use LTFS to read/write tapes that are put into it. For the sake of clarity, some details such as slots in tape library 210 are not shown in FIG. 2. In one embodiment, each tape in tape library 210 may be used to store data that is compressed, data that is encrypted, data that is both compressed and encrypted or data that is neither compressed nor encrypted. A tape in tape library 210 may initially not be formatted with LTFS until it is needed—at which time it will be formatted according to the policies of the file(s) to be written on the tape, either compressed or uncompressed.

Archive Node Appliance 200 comprises Filesystem in Userspace (FUSE) module 212 that may present a single file system (or 'volume' in one implementation) to a local operating system. That file system can then be presented to host device(s) on the network via network file system interface module 213. Network file system interface module 213 provides access to all or a portion of the FUSE file system as one or more shared volumes (e.g., as a hierarchical file system with directories, etc.) that can be accessed using an interface that operates according to network file system protocol 214 such as NFS, CIFS, FTP, REST, etc. Example interfaces include NFS, CIFS, FTP, REST interfaces. Other means of presenting the one (or more) file systems/volumes to the network may also be implemented. Data associated with the one or more shared volumes can be stored on one or more partitions of data store 218 (a computer readable memory), where the structure of the partitions of data store 218 may, or may not, correspond to the structure of the shared volume(s) presented by network file system interface module 213.

Directory operations module 220 is configured to process any directory operations that are received by FUSE module 212. I/O operations module 222 is configured to process any input or output operations involved with the reading or the storing of files associated with the file system presented by FUSE module 212. These operations include, for example, the writing of files to data store 218, the reading of files from data store 218, the deletion of files from data store 218, the reading of files from a tape in tape library 210 or other operations associated with data store 218 or tape library 210.

These I/O operations may involve the use of LTFS module 224, LTFS management module 232, library control module 234, tape performance optimization module 240, file migration module 226, and index 236. The location of each tape within tape library 210 may be maintained in index 236 (e.g., in which slot or drive each tape is located, in which library the tape is located if multiple tape libraries are in use, etc.). Additionally, in one embodiment, information on what type of data (encrypted, compressed, unencrypted, uncompressed, etc.) is stored on each tape may also be maintained in index 236.

Library control module 234 is configured to control the movement of tapes in tape library 210, including ejecting the tapes from the drives of tape library 210, and the movement of tapes to and from slots of tape library 210 and in and out of drives of the tape library using the robot. LTFS management module 232 is configured to mount or unmount the LTFS file system on a particular tape in a drive of tape library 210. LTFS module 224 is configured to perform LTFS operations with respect to an LTFS mounted file system.

LTFS module 224, LTFS management module 232, Library control module 234, and index 236 may also be utilized by file migration module 226. File migration module 226 is configured to move files from data store 218 to tape library 210 based on policies 228. File mapping module 238 maintains map 242 which correlates a file visible through the FUSE file system to its corresponding location in tape library 210. Specifically, a mapping between the location (for example the path) and name of the file with respect to the FUSE file system, the name and location of that file in the data store 218 and the name and location of that file on one or more tapes in tape library 210 may be maintained in map 242.

Policies 228 may, or may not, be user configured and may be associated with storage of the files or the migration of files from data store 218 to tapes in tape library 210. Such policies may specify, for example, how long to wait before migrating a file (referred to herein as a migration timeout period), whether the files are to be replicated when migrated (e.g., stored in conjunction with multiple Archive Nodes), how many copies of the file to keep, where multiple copies may be kept on different tapes, whether the file is to be encrypted or compressed, etc. Policies 228 may be defined with respect to the directories presented with respect to FUSE module 212 such that those policies may be defined with respect to all files within that directory. Policy management module 230 allows these policies to be managed (e.g., created, updated, defined, deleted, modified, etc.) by a user or otherwise. Policies can be defined at any level of the directory structure provided by FUSE module 212. Because a directory presented by FUSE module 212 may be presented as a shared volume ("a share") by network file system interface module 213, a policy that applies to the directory may also apply to the share.

In operation then, Archive Node Appliance 200 may present a network based file system accessible through an interface, where the files associated with the network based file system may be stored on tape library 210 according to a file system structure that substantially mirrors the file system structure of the presented network based file system. In one embodiment, mirroring the file system structure of the presented network based file system means that at least a portion of the path of the location of the file as it is stored on tape library 210 may be substantially similar to the path of the location of the file as it is presented through the file system.

More specifically, users at host devices coupled to the Archive Node Appliance 200 may perform directory operations and store or read files using an interface for the network based file system provided by the Archive Node Appliance 200. In accordance with these user initiated operations, commands in the network file system protocol 214 employed by the interface may be received at the Archive Node Appliance 200 and implemented by FUSE module 212 with respect to the partitions of data store 218. If the command is associated with a directory operation it may be processed by directory operations module 220. If the command is for the storing of a file, the I/O operations module 222 may write this file to a location in the data store 218. Map 242 may be updated to comprise a mapping between the location and name of the file with respect to the FUSE file system and the name and location of that file in the data store 218.

In one embodiment, the file is stored in data store 218 according to the one or more policies that apply to that file. For example, if a policy that applies to the file specifies that the file should be compressed the file may be compressed before the file is stored in the data store 218. Similarly, if an applicable policy specifies that the file is to be encrypted the file may be encrypted before it is stored in data store 218. In certain embodiments, a self-encrypting disk, full disk encryption or a RAID controller which performs encryption may be utilized in conjunction with data store 218, such that all files stored in data store 218 may be encrypted by the disk or controller when the file is stored to data store 218. In such cases, all files stored to data store 218 may be encrypted when stored to data store 218 and decrypted when read from data store 218.

Based on one or more of the policies 228, at some later point a file may be migrated to tape library 210. As policies 228 may be defined based on a location associated with the presented file system, policies associated with the location (e.g., directory, share, etc.) where the file is stored may be determined from policies 228 and the determined policies applied to migrate the file.

As the file may be received over a network, errors may occur during the transmission of the file or the storage of the file to the data store. To account for network errors or the like, in one embodiment, a time period referred to as a migration timeout period can be utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance. As another example, a policy specifying an amount of data to be written on a tape may be defined using policy management module 230 through operator interface 202 of Archive Node Appliance 200. Once a file is selected for migration, one or more policies 228 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using index 236. If the appropriate tape is not currently in a drive of the tape library, library control module 234 may be utilized to load the appropriate tape into a drive of tape library 210. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 232. File migration module 226 may use LTFS module 224 to copy the file from data store 218 to the appropriate tape at a location on the tape which corresponds to the location of the file as presented through the file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by Archive Node Appliance 200. Additionally, when the file is copied to the mounted LTFS file system on the appropriate tape, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to LTFS module 224 that data to be stored on the tape is to be compressed. LTFS module 224 may configure the drive holding that tape to compress data such that when the file is stored to the tape using LTFS module 224 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles other operations including the encryption of the data that are transparent to LTFS.

When a command to read a file is received, map 242 may be consulted to determine the location of the file (e.g., whether it is located in data store 218, on a tape in tape library 210 or both). If the requested file is completely on data store 218, I/O operations module 232 may respond to the read of the file using the file as stored in data store 218. If the file is on a tape (and not entirely in data store 218), the tape on which the file is located may be determined using map 242. Index 236 and library control module 234 can then be utilized to determine if the tape is in a drive, and if not, to load the appropriate tape into a drive of tape library 210. The file system on the tape may be mounted using LTFS management module 232. I/O operations module 222 can then use LTFS module 224 to access the file on the tape and respond to the read of the file.

In the example shown in FIG. 2, read cache 250 may be maintained on data store 218. Read cache 250 may comprise a first portion of each file stored in data store 218 using a network based file system presented by Archive Node Appliance 200. When a file is read, then, if any portion of the file is to be read from a tape, the first portion of the read file that is stored in read cache 250 may be used to respond to the read, while substantially simultaneously accessing the file on the tape. Since the first portion of this file is stored in read cache 250 on data store 218, it can be accessed quickly enough that a timeout on commands can be avoided while the file on the tape is accessed. The remainder of the file can then be read from the tape and used to respond to the commands. The size of the first portion of each file may be user-configurable, based on system parameters, or defined in some other manner.

It will be noted that read cache 250 may comprise first portions of none, all, or some subset of, the files that are stored in conjunction with the network based file system. For example, if data store 218 is corrupted or otherwise unusable, when data store 218 is replaced, read cache 250 may not comprise any first portions of the files. Read cache 250 may then be repopulated as files are accessed by users through the network based file system. During this repopulation then, read cache 250 may comprise first portions of some subset of the files that are stored in conjunction with the network based file system.

Accordingly, in some embodiments, when a file is read if any portion of the file is to be read from tape it can be determined if there is a first portion of that file in read cache 250. If there is, that first portion may be used to respond to the read as detailed above. If, however, there is not a first portion of the read file in read cache 250, the file may be read from tape and used to respond to the read. Additionally, the file data read from tape may be used to repopulate read cache 250 by storing the first portion of the read in read cache 250 at that time.

The host device may send a READ command for a certain amount (e.g., 64K or a different amount) of the file to Archive Node Appliance 200. I/O operations module 222 can delay the response to this READ command as long as possible without a timeout resulting (e.g., 20 seconds, 29 seconds, or another time period below the 30 second timeout). After the delay, I/O operations module 222 will respond to the READ command with the data requested. I/O operations module 222 may continue to delay responses to subsequent READ commands and utilize data from read cache 250 to respond to the READ commands until data from the first portion of the file is exhausted or the LTFS file system on the appropriate tape is mounted and the file on the tape can be accessed using LTFS module. I/O operations module 222 may continue to delay responses and dynamically switch between delaying responses and not delaying responses as needed.

In addition to delaying responses, Archive Node Appliance 200 can return less data than requested by the host. For example, Archive Node Appliance 200 may return 1K instead of the requested 64K. Whether Archive Node Appliance 200 returns less data than the amount requested may depend on the network file system protocol, host operating system or other factors. Returning less data than requested provides the advantage that the read cache can be smaller.

I/O operation module 222 may then use LTFS module 224 to access the file on the tape and respond to subsequent READ commands for the file. More specifically, in one embodiment, I/O operations module 222 may utilize LTFS module 224 to access the file on the appropriate tape and read the file from the tape into buffer 244. Subsequent READ commands for the file may be responded to using the data in buffer 244.

Furthermore, in some embodiments, in addition to reading the file into buffer 244, the file may also be read into file cache 260 on data store 218. File cache 260 may be an area on data store 218 utilized for temporary storage of files and may be managed according to almost any cache management technique desired.

When the tape is no longer needed for writing data to and/or reading data from, the file system on the tape may be unmounted using LTFS management module 232. When an LTFS mount is terminated via an unmount command, the current LTFS Index is written to the Index Partition, which is the first partition on the LTFS Tape.

Figure 3:
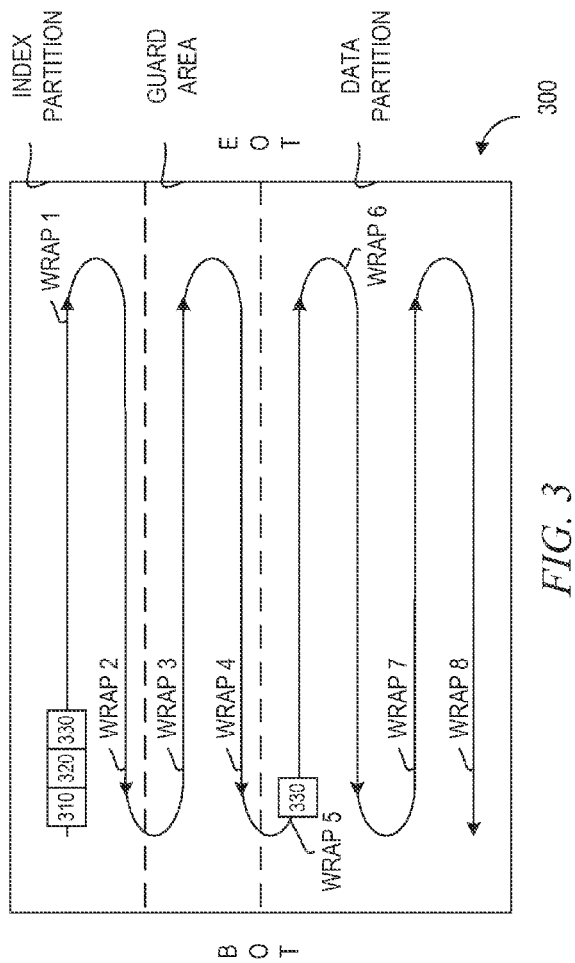
FIG. 3 depicts a diagrammatic representation of a logical view of an LTFS volume.

At this point, it may be helpful to provide an example of the LTFS volume layout. FIG. 3 depicts a diagrammatic representation of a logical view of an LTFS volume on a magnetic tape. An LTFS volume is comprised of a pair of LTFS partitions. LTFS defines two partition types: data partition and index partition. Thus, an LTFS volume contains an index partition and a data partition and the two partitions may be separated by a guard area as shown in FIG. 3. Each partition in an LTFS volume has a label construct followed by a content area. The content area may contain some number of interleaved index constructs and data extents. A label construct contains identifying information for the LTFS volume. An index construct contains an index. An index is an XML data structure which describes the mapping between files and data extents, but it does not contain file data. A data extent contains file data written as sequential logical blocks. A file can have zero or more data extents plus associated metadata stored in the index construct. A "blocksize" field of the LTFS Label defines the block size used in data extents.

Following the same rule as a data extent, each index is written as a sequence of one or more logical blocks of size "blocksize" using the value stored in the LTFS label. Each index data structure contains the following pieces of information for verifying the consistency of an LTFS volume:

A generation number, also referred to as the index generation number, which records the age of this particular index relative to other indexes in the volume.

A self-pointer, which records the volume to which the particular index belongs and the block position of the index within that volume.

A back-pointer, which records the block position of the last index present on the Data Partition immediately before this particular index was written.

An index generation number is a non-negative integer that increases as changes are made to the volume. The LTFS Specification defines a modification tracking system to track file system changes in the LTFS Index by monotonically increasing the index generation number. Generation numbers are assigned in the following way.

Given two Indexes on a partition, the one with a higher block position has a generation number greater than or equal to that of the one with a lower block position.

Two indexes in an LTFS volume may have the same generation number if and only if their contents are identical.

In any consistent LTFS volume, the index with the highest generation number on the volume represents the current state of the entire volume. The operation of preserving the current state of the LTFS Index on the medium is referred to as performing an LTFS Sync. Before discussing this sync operation, it may be helpful to understand how LTFS tapes are written.

FIG. 3 illustrates an empty index partition, containing volume label 310 and LTFS label 320 followed by index 330, which represents the current state of the entire volume. LTFS tapes are, today, only LTO-5 tapes. As illustrated in FIG. 3, LTO tapes are all written in a serpentine fashion. This means that continuously writing to tape 300 causes tape 300 to pass across the heads (see FIG. 4) from start (BOT) to end (EOT). Each pass of the tape (from start of tape to end of tape or from end of tape to start of tape) is known as a wrap. In practice, a newly formatted, empty tape has an index in both the data partition and the index partition. The index is always written to the data partition. In addition, a guard area is required to exist between the index and data partitions. These partitions are allocated as multiples of two wraps. Thus, the smallest possible partition size is two wraps. As an example, two wraps may provide approximately 37.5 GB of uncompressed data storage. Currently, an LTO-5 tape has a storage capacity of 1.5 TB. The index partition consists of two wraps (approximately 18.75 GB each), the guard area consists of two wraps (approximately 18.75 GB each) and the data partition has a storage capacity of approximately 1.43 TB.

Figure 4:
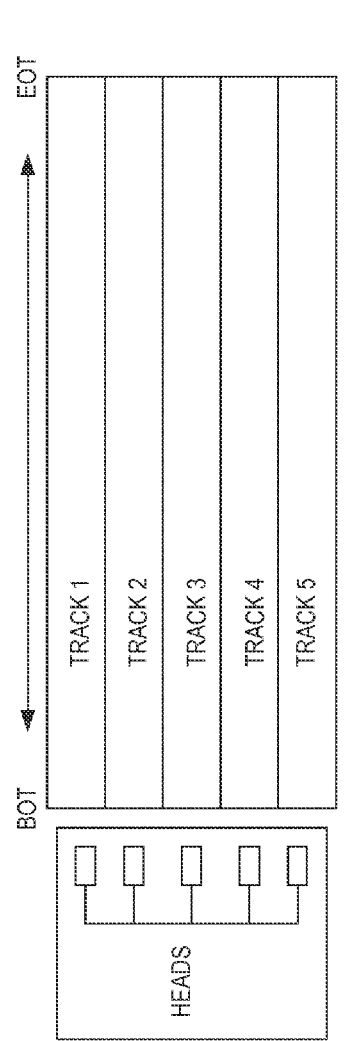
FIG. 4 depicts a diagrammatic representation of a wrap having multiple tracks.

As illustrated in FIGS. 3 and 4, continuously writing to tape 300 causes tape 300 to pass across the heads, writing multiple tracks of a wrap (e.g., Wrap 1) in parallel. The heads will then be repositioned to the next set of tracks (e.g., Wrap 2) and the tape will pass across the heads again, this time from the end back to the start. The number of tracks shown in FIG. 4 is meant to be illustrative. The actual number of tracks may vary from implementation to implementation. Likewise, the number of wraps as well as the number of writing circuits (referred to as heads in FIG. 4) may vary from implementation to implementation.

Currently, when a tape is mounted the mount operation reads the index from the index partition of the tape into a memory. Any change to the file system is kept in the memory until the file system is unmounted. The index in the memory is updated whenever a change is made to a file system mounted on the tape. A copy of the index is always written to the data partition of the tape. One option is to write a copy of the index to the data partition at a time interval. For example, a default setting may cause the system to write a copy of the index to the data partition every 5 minutes. Another option is to write a copy of the index to the data partition on every file close. Yet another option is to write a copy of the index to the data partition only at the time the tape is unmounted. A copy of the index can also be written to the data partition using an LTFS Sync operation. As those skilled in the art will appreciate, a file system sync operation can be initiated or otherwise caused by writing any value to a write-only extended attribute known as "ltfs.sync" available at the root directory of the tape. If the index has changed since the last sync operation, the sync operation writes the in-memory version of the index to the index partition and advances the index generation number by a predetermined value. According to the LTFS Format Specification 2.0.1, the value of the generation number between any two successive Indexes may increase by any positive integer value.

Figure 5:
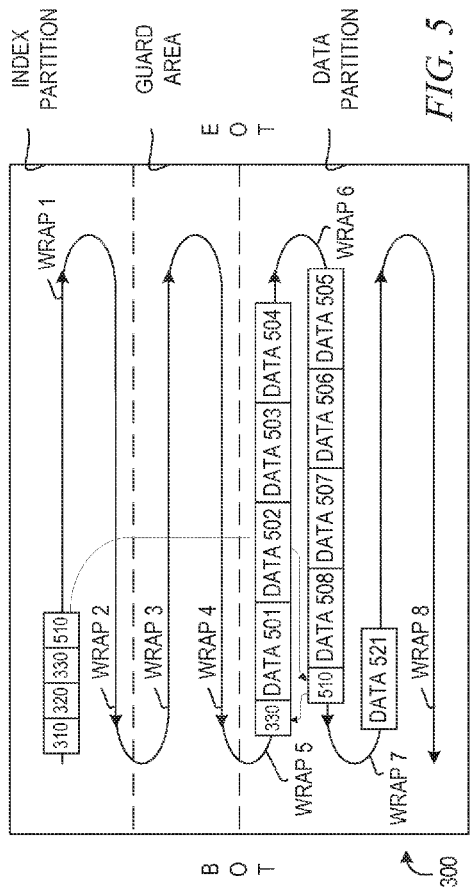
FIG. 5 depicts a diagrammatic representation of a tape having an index partition and a data partition.

As illustrated in FIG. 5, suppose tape 300 is to be unmounted after logical blocks 501-508 are written. An unmount operation is performed and no error code was returned. In one embodiment, only the unmount operation will write the index into the index partition and, if no previous sync has occurred, the unmount operation will cause the index to be written to both the index and the data partitions. Thus, in this example, the in-memory version of the index is written to both the data partition and the index partition as index 510. Index 510 now represents the current state of the entire volume and points back to the original index 330 that was written into the data partition when it was initially formatted. According to the LTFS Format Specification, section 3.4.3, each index contains at most one back pointer. If the index resides in the data partition, the back pointer contains the block position of the preceding index in the data partition. If no preceding index exists, no back pointer is stored. If the index resides in the index partition and has a generation number N then the back pointer for the index contains either the block position of an index having generation number N in the data partition, or the block position of the last index having at most generation number N−1 in the data partition. If no index of generation number N−1 or less exists in the data partition, then the index in the index partition is not required to store a back pointer. Thus, on a consistent volume, the final index in the index partition contains a back pointer to the final index in the data partition. As a consequence of these rules, no index may contain a back pointer to itself or to an index with a higher generation number. Readers are directed to the LTFS Format Specification, section 7.2, for additional information on back pointers and an example index.

This process of writing the in-memory version of the index to the data partition works fine if the sync operation is successful. However, if the sync operation fails or if the file system crashes before a sync operation can be performed, the in-memory version of the index is not written to the tape. Currently, when a sync fails, the LTFS simply returns an error message. Referring to FIG. 5, suppose the tape has been remounted in a consistent state with index 510 being the latest index and existing in both the index and data partitions. If the system crashes after block 521 is written to tape 300, the in-memory version of the index which tracked the addition of block 521 to tape 300 is not written to the data partition of tape 300. Consequently, when tape 300 is re-mounted, the LTFS will not know the data that had been written to the tape since the tape was last mounted. Thus, the LTFS will use index 510 on tape 300 which has not been updated since the last successful LTFS Sync and which contains information on sequential logical blocks 501-508 but not on block 521.

Embodiments disclosed herein provide a system and method for verifying when data is synchronized on an LTFS tape and for recovering the data in case of failure. In the above example in which ltfsck is used to recover the tape from a mount failure, the end result is that the recovered tape does not know about block 521 since it must fall back to index 510. As will be discussed in more detail below, when the index is written to the data partition, the file system could be recovered with ltfsck, even if the index is not written to the index partition. However, an error occurs when the index is not written to the data partition of the tape and some data that have been "written" to the tape may not have a matching index on the tape. The system and method disclosed herein can provide a way to ensure that the data has both been written to tape and has a matching index written to tape. Specifically, embodiments utilize the success of an LTFS Sync operation as the indicator of successful data transfer onto an LTFS medium. Any data that has been "written" to the tape will not be considered as having actually been written until a sync operation corresponding to the data has been successful in writing the in-memory version of the index into the data partition of the tape. Embodiments disclosed herein can address the problem of not getting the index written to the data partition and ensure that files written to tapes are recoverable. This can be accomplished by grouping files together and writing them to tape as a block and performing a sync operation to ensure that the block of files can be recovered should the index in the index partition not be updated (for example, using ltfsck). In one embodiment, the sync operation can be performed after every block of file(s) is written to tape. The size of a block of files written to tape may vary depending upon various factors. Example factors may include the length of time a file has been waiting to be written to tape, the size of the file, the tape partition allocation, etc. For example, although a file of 4K is small relative to the size of two wraps, instructions implementing embodiments disclosed herein may force the file to be written to tape after a predetermined amount of time has passed. Instructions implementing embodiments disclosed herein may then cause a sync operation to be performed to update the index in the data partition on tape. As another example, files to be written to tape may be grouped such that they occupy approximately two wraps or a multiple thereof. In this embodiment, each time a block of approximately two (or a multiple thereof) tape wraps of files is written to tape, a sync operation can be performed to update the index in the data partition on tape. In this embodiment, the sync operation will occur at most once for every group of files. Writing the index to tape, via a sync operation (ltfs.sync in some embodiments), after every group is written to tape can ensure that at least the index in the data partition actually reflects the existence of the new file(s). This solution allows the system to recover the file(s) (e.g., using ltfsck).

This solution can provide many benefits over other options. For example, having a sync operation performed automatically every few minutes can produce non-deterministic results, since it may not be clear as to whether or not the sync operation had occurred, making it very difficult to ascertain right away whether the files are actually on tape. A user could wait out the predetermined time period (e.g., 5 minutes) after writing the files to make sure that the files have indeed been successfully written to tape. However, this option is time-consuming and not at all practical. Another option is to have a sync operation performed on every file close. However, this option would cause additional overhead in both time and tape space. The index itself can be of considerable size, so writing it can take time and occupy a lot of tape space. Thus, this option can be very wasteful. Embodiments disclosed herein can be substantially far more efficient than other options at least because a sync operation is not required to run every few minutes and/or to run on every file close.

For example, referring to FIG. 3, when tape 300 is mounted, the mount operation may write index 330 into a memory of an embodiment of an Archive Node Appliance described above. Any change to the file system is kept in the memory. In one embodiment, after a predetermined amount of data is written to the tape, a sync operation is performed. In one embodiment, a sync operation is performed when a predetermined amount of time has passed since a file is written to the tape. In some embodiments, computer instructions executing on an Archive Node Appliance may perform an LTFS Sync to write the index in the memory into the data partition of the tape after a predetermined amount of data is written to a tape, a predetermined amount of time has passed, a predetermined condition has been met, etc. The predetermined amount of data can be configurable. For example, in some embodiments, the predetermined amount of data may be sufficient to write two wraps or a multiple of two wraps. In some embodiments, the predetermined amount of data may contain one or more files. As discussed above, each file can have zero or more data extents, each containing file data written as sequential logical blocks. Now, referring to FIG. 5, suppose logical blocks 501-508 are of a sufficient amount to write two wraps, a sync operation may be performed after the two wraps are written to tape 300. This is done regardless of whether the tape is to be unmounted. In this case, the in-memory version of the index is written to the data partition as index 510. If the tape is to be unmounted at this point, the unmount operation may cause the LTFS unmount operation to write index 510 from the memory into the index partition of tape 300. If this operation of writing the index 510 to the index partition of tape 300 is not successful, the next time tape 300 is mounted, LTFS may determine that index 330 in the index partition does not match index 510 in the data partition. This would cause the LTFS mount operation to fail and a LTFS utility called ltfsck would be used to perform a recovery operation. Those skilled in the art will appreciate that a conventional LTFS system does not perform such a recovery operation automatically. Rather, a user of a conventional LTFS system may receive a notice of an error. The user would then need to run the ltfsck utility. In some embodiments, computer instructions executing on the Archive Node Appliance may cause the recovery operation to be performed automatically. As a result of this automatic error recovery operation, the index partition is updated with index 510 which represents the current state of the entire volume. As illustrated in FIG. 5, index 510 residing in the index partition now points back to index 510 residing in the data partition which then points back to index 330 in the data partition.

Notice in this case, a sync operation corresponding to data blocks 501-508 was successful in writing the in-memory version of the index into the data partition of the tape as index 510. Thus, data blocks 501-508 are considered to have been actually written to the tape, even though an error occurred before the in-memory version of the index could be written to the index partition.

Figure 6:
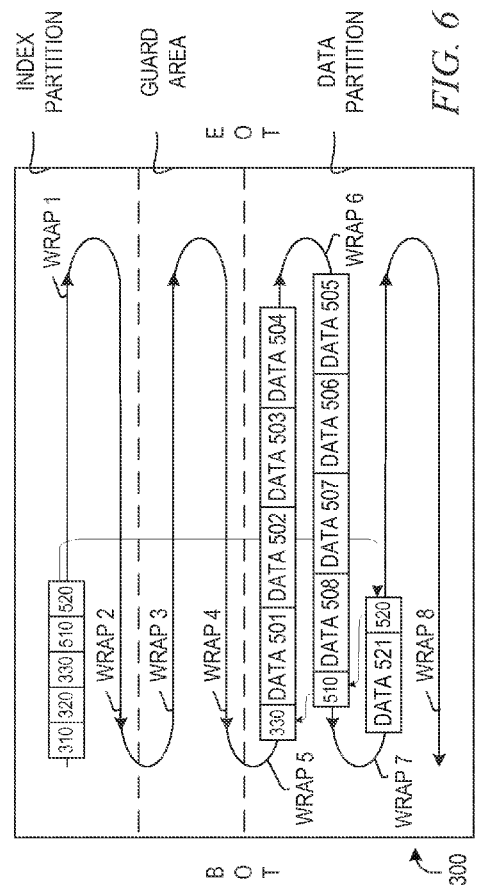
FIG. 6 depicts a diagrammatic representation of a tape exemplifying how sequential logical blocks can be added to an LTFS volume.

This process can be particularly useful if for any reason the in-memory version of the index cannot be written into the index partition before the tape is properly unmounted. For example, as illustrated in FIG. 6, suppose a sync operation is performed to write the in-memory version of the index into the data partition as index 520 after block 521 is written to tape 300 and a predetermined amount of time has passed. Now suppose tape 300 is to be unmounted. However, the file system crashes or encounters a hard error before the in-memory version of the index can be written into the index partition. This time, when the tape is re-mounted, the LTFS will detect that index 510 in the index partition does not match index 520 in the data partition and the LTFS mount operation would fail. As discussed above, the ltfsck utility could then be called to perform a recovery operation automatically and update the index partition with index 520 which references data block 521.

As illustrated in FIG. 7, according to one embodiment of method 700, after the data is written onto tape a sync operation may be performed to write an index from the memory to the data partition of the tape (step 702). If that sync is successful (step 704, via a return code from the sync operation), control is returned to the next module in the Archive Node Appliance. If that sync is not successful, all the data written in this operation are considered to have never been successfully written to tape (step 706). In step 706, the operation to write the data to tape can be retried—either on the same tape or a different tape—as a natural consequence of the operation not having been successful. If the indexes in the data partition and the index partition end up not matching each other, the index in the index partition will be updated using the index in the data partition as described above. This change is reflected in the index in the memory and the process may be repeated until a sync operation is successful. Until then, the data which did in fact get written onto the tape will not be considered as having been written onto the tape, despite the fact that the data had been written to tape.

As an example, suppose the data is being written to a tape and the tape is bad—a bad spot on the tape. The sync operation tries to write the index from the memory into the data partition and it fails completely. Various scenarios can fail a sync operation. For example, power went off just when the index is about to be written. When LTFS gets a hard error on the tape, it turns the file system mounted on the tape into a read-only system. Nothing can be written onto the tape until the tape is unmounted and then re-mounted again. Thus, in one embodiment, if the tape is bad or if the tape is no longer accessible, the data is written to another tape.

Again, if an error occurs on the next mount, ltfsck may see the mismatched indexes, and write the correct index from the data partition into the index partition. ltfsck may also be used to go back to a certain index generation by putting that index in the index partition and now all data written to the tape past that index generation will no longer be accessible. This allows a user to go back to the older (and known to be good) version of the file (written via the previous index).

Accordingly, embodiments provide a system and method for verifying when sets of files are synchronized on an LTFS tape. The method may require that the LTFS tape is mounted with the synchronization type as "unmount." The method may also require that the status of the file set to be written is preserved in some persistent way.

The invention utilizes the success of an LTFS Sync operation as the indicator of a successful data transfer onto an LTFS medium. When the files are written to an LTFS FUSE file system, an LTFS Sync operation records the LTFS index, and thus all of the information about the files system, to the physical LTFS medium. Prior to the LTFS Sync, any file system changes are held only in memory. The files written to an LTFS tape will not be recoverable in any future tape session unless an LTFS Sync has been performed on the tape. After a successful write of files to the LTFS file system, a programmatic LTFS Sync is performed to ensure that the LTFS Sync operation is successful. The method then is able to record that the file set has been written successfully to the LTFS medium.

The invention provides a method of recovery so that when an LTFS Sync fails, when the file set fails to be successfully written to tape, or if the system experiences an event that terminates the LTFS mount, the user of LTFS has a way to know what files are retrievable on tape and which are not without the need to mount the tape and examine the file system. More specifically, the method of recovery in case of failure may attempt to write the files again, but to write in such a way that any previous (incomplete) version of the file is not preserved. In this way, only complete, valid, retrievable files are left on the LTFS medium.

The invention can provide many advantages. For example, the state of the LTFS-based file system can be communicated with respect to any partial or failed file transfers without the requirement that the tape is mounted and file contents are compared. Furthermore, the invention provides a method to ensure that files written to the LTFS mounted file system are retrievable in their entirety from the tape the next time the tape is loaded after any failure regardless of the failure.

A computer program product implementing the method described above may comprise at least one non-transitory computer readable medium storing instructions translatable by a processor to perform the method. Embodiments disclosed herein may implement any suitable computer readable medium, including those known in the art (e.g., optical disk, magnetic disk, flash memory, RAM, ROM, EEPROM or other computer readable medium). Additionally, embodiments may be implemented as hardware, software programming or some combination thereof. For example, a system implementing the method may be implemented in standalone devices, routing devices such as routers, bridges, hubs or other types of network devices. In one embodiment, the system comprises an archive node appliance.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms. The functions of the invention can be achieved by various means. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code).

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the disclosure should be determined by the following claims and their legal equivalents.

What is claimed is:

1. An apparatus, comprising:
   a memory;
   at least one processor; and
   at least one non-transitory computer readable medium storing instructions translatable by the at least one processor to:
   when a tape is mounted on a drive, write an index from an index partition of the tape into the memory such that the memory stores an in-memory version of the index;
   after a predetermined amount of time has passed, after a predetermined condition has been met, or after a predetermined amount of data has been written to the tape, perform a synchronization operation to write the in-memory version of the index to a data partition of the tape such that the data partition of the tape stores a copy of the in-memory version of the index;
   when the tape is to be unmounted, perform an unmount operation to write the in-memory version of the index from the memory into the index partition of the tape;
   when the tape is to be mounted again, compare indexes most recently written to the index partition of the tape and to the data partition of the tape; and
   if the indexes do not match, automatically perform a recovery operation to update the index partition of the tape with the copy of the in-memory version of the index from the data partition of the tape.

2. The apparatus of claim 1, wherein the predetermined amount of data comprises a block or group of files approximately two wraps of the tape or a multiple of two wraps of the tape in size.

3. The apparatus of claim 1, wherein the stored instructions are further translatable by the at least one processor to update the in-memory version of the index whenever a change is made to a file system mounted on the tape.

4. The apparatus of claim 3, wherein, prior to the synchronization operation, any changes to the file system are held only in the memory.

5. The apparatus of claim 1, wherein the synchronization operation comprises advancing an index generation number by a predetermined value.

6. The apparatus of claim 1, wherein the stored instructions are further translatable by the at least one processor to write a previous index from the data partition of the tape into the index partition of the tape.

7. The apparatus of claim 1, wherein the synchronization operation is a Linear Tape File System (LTFS) sync operation.

8. A method for writing data to tape, comprising:
   when a tape is mounted on a tape drive, writing an index from an index partition of the tape into a memory of an archive node appliance connected to the tape drive such that the memory stores an in-memory version of the index;
   after a predetermined amount of time has passed, after a predetermined condition has been met, or after a predetermined amount of data has been written to the tape, the archive node appliance performing a synchronization operation to write the in-memory version of the index to a data partition of the tape such that the data partition of the tape stores a copy of the in-memory version of the index;
   when the tape is to be unmounted, the archive node appliance performing an unmount operation to write the in-memory version of the index from the memory into the index partition of the tape;

when the tape is to be mounted again, the archive node appliance comparing indexes most recently written to the index partition of the tape and to the data partition of the tape; and if the indexes do not match, the archive node appliance automatically performing a recovery operation to update the index partition of the tape with the copy of the in-memory version of the index from the data partition of the tape.

9. The method according to claim 8, wherein the predetermined amount of data comprises a block or group of files approximately two wraps of the tape or a multiple of two wraps of the tape in size.

10. The method according to claim 8, further comprising:

updating the in-memory version of the index whenever a change is made to a file system mounted on the tape.

11. The method according to claim 10, wherein, prior to the synchronization operation, any changes to the file system are held only in the memory.

12. The method according to claim 8, wherein the synchronization operation comprises advancing an index generation number by a predetermined value.

13. The method according to claim 8, further comprising:

writing a previous index from the data partition of the tape into the index partition of the tape.

14. The method according to claim 8, wherein the synchronization operation is a Linear Tape File System (LTFS) sync operation.

15. A computer program product comprising at least one non-transitory computer readable medium storing instructions translatable by at least one processor to:

when a tape is mounted on a tape drive, write an index from an index partition of the tape into a memory of an archive node appliance connected to the tape drive such that the memory stores an in-memory version of the index;

after a predetermined amount of time has passed, after a predetermined condition has been met, or after a predetermined amount of data has been written to the tape, perform a synchronization operation to write the in-memory version of the index to a data partition of the tape such that the data partition of the tape stores a copy of the in-memory version of the index;

when the tape is to be unmounted, perform an unmount operation to write the in-memory version of the index from the memory into the index partition of the tape;

when the tape is to be mounted again, compare indexes most recently written to the index partition of the tape and to the data partition of the tape; and if the indexes do not match, automatically perform a recovery operation to update the index partition of the tape with the copy of the in-memory version of the index from the data partition of the tape.

16. The computer program product of claim 15, wherein the predetermined amount of data comprises a block or group of files approximately two wraps of the tape or a multiple of two wraps of the tape in size.

17. The computer program product of claim 15, wherein the instructions are further translatable by the at least one processor to:

update the in-memory version of the index whenever a change is made to a file system mounted on the tape.

18. The computer program product of claim 17, wherein, prior to the synchronization operation, any changes to the file system are held only in the memory.

19. The computer program product of claim 15, wherein the synchronization operation comprises advancing an index generation number by a predetermined value.

20. The computer program product of claim 15, wherein the instructions are further translatable by the at least one processor to:

write a previous index from the data partition of the tape into the index partition of the tape.

* * * * *